May 23, 1939.   C. E. MARSHALL   2,159,745
INSIGNE INSERT CLIP
Filed Oct. 1, 1938
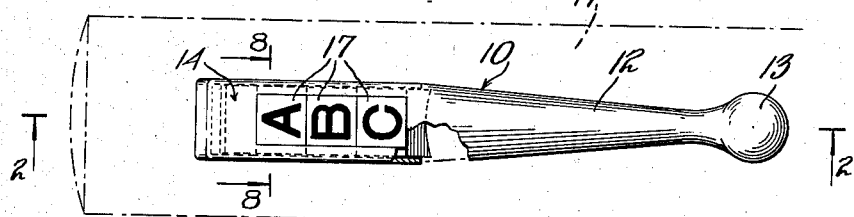
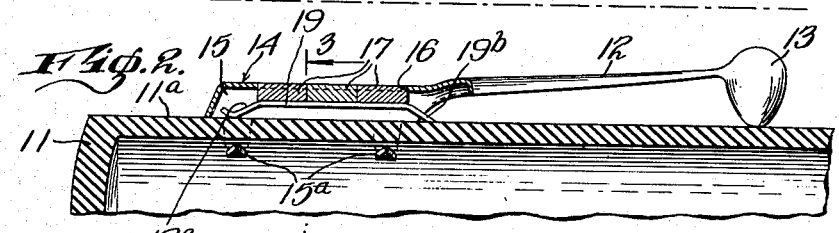
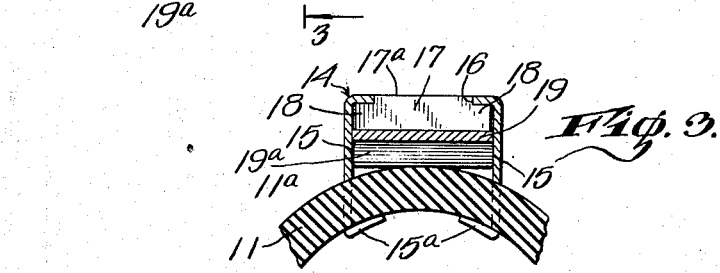
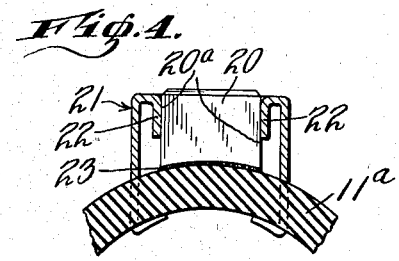 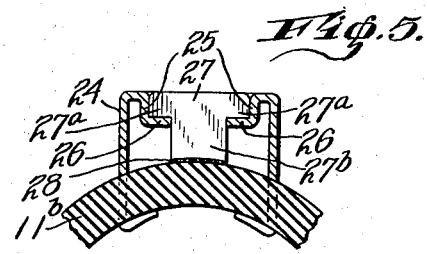
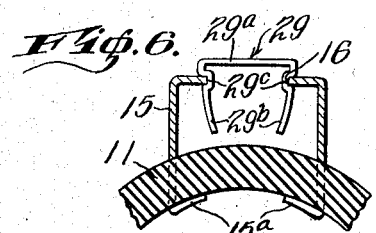 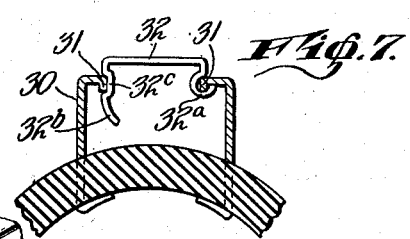
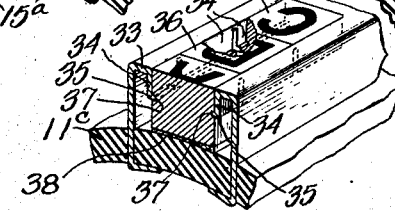
INVENTOR
CLINTON E. MARSHALL
BY
ATTORNEY Patented May 23, 1939

2,159,745

UNITED STATES PATENT OFFICE 2,159,745

INSIGNE INSERT CLIP

Clinton E. Marshall, Bronx, N. Y.

Application October 1, 1938, Serial No. 232,727

6 Claims. (Cl. 40—140)

This invention relates to clips intended for use in connection with fountain pens and other similar devices, for retaining the same against displacement from pockets or other supports for articles of this kind, and the object of the invention is to provide a simple, economical form of clip comprising a unitary body having integral means for mounting the same in connection with a fountain pen or other suitable support and having means at the mounting end thereof for selectively attaching insignia elements to said clip and retaining the same against displacement from said clip and support; a further object being to provide an elongated aperture or cut-out portion in the mounting end of said clip adapted to receive said elements as a panel within the boundary edges of the clip, the side edges of said cut-out portion being fashioned to support the insignia elements in proper alinement with respect to said clip and to provide means cooperating with the support for retaining said elements against displacement from said clip; a still further object being to provide means for supporting said elements in tensional engagement with the edges of the aperture or cut-out portion of said clip; and with these and other objects in view, the invention consists in a device of the class described, which is simple in construction, efficient in use, and which is constructed as hereinafter described and claimed.

The invention is fully disclosed in the following specification, of which the accompanying drawing forms a part, in which the separate parts of the improvement are designated by suitable reference characters in each of the views, and in which:

Fig. 1 is a plan view of my device showing one type of insignia arranged therein.

Fig. 2 is a partial sectional view substantially along the line 2—2 of Fig. 1.

Fig. 3 is a sectional view on the line 3—3 of Fig. 2.

Figs. 4, 5, 6 and 7 are views similar to Fig. 3 showing modified forms of insignia elements and slight variations in the means for supporting the elements in connection with the clip; and Fig. 8 is a sectional and perspective view, for example on the line 8—8 of Fig. 1, and showing a portion of a clip, but illustrating a further modified form of insignia elements and retaining means therefor.

For purposes of illustrating one use of my invention, I have shown a spring clip 10 of a more or less conventional type, arranged on a fountain pen cap or similar support 11 and having a spring arm 12 with a knob 13 at the end thereof. The mounting end 14 of the clip 10 is of substantially U-shaped cross-sectional form to provide downwardly projecting side walls 15 having extending clips 15a for mounting the same in connection with the fountain pen cap or other support. The lower edges of the walls 15 closely engage the outer surface 11a of the support 11, insuring a neat and at the same time rigid mounting of the clip 10 thereon.

The outer crosshead of the U-shaped mounting end 14 is provided with an elongated aperture or cut-out portion 16 for receiving various insignia elements 17 shown for purposes of illustration as being characterized by the letters A, B, and C. It will be understood, however, that any type of insignia such as numerals, coats of arms and the like may be arranged on the elements 17 and that the particular shape and contour of the cut-out portion of the clip as well as the shape of the elements 17 may be varied in producing different styles of clips.

I have shown the insignia elements 17 as comprising shallow blocks of uniform length and thickness and having a relatively narrow characterized portion 17a fitting snugly in the cut-out portion of the clip. The blocks 17 inwardly of the portion 17a thereof are relatively wide forming shoulders 18 adapted to bear against the inner surface of the top wall of the clip. It will be apparent that the blocks 17 are sufficiently thin to be slid under the mounting portion 14 of the clip when the clip is secured to a pen cap or other support, and that when the blocks 17 are arranged in position in the aperture 16, there will be substantial clearance between the inner surface of said blocks and the outer wall of the support.

I have shown a spring 19 for supporting the blocks or insignia elements 17 in close engagement with and against displacement from the clip. The end 19a of the spring is curved to slide freely along the surface of the support and to provide for spacing of the main portion of the spring therefrom. The end 19b of the spring is curved inwardly and resiliently engages the wall of the support to retain the spring 19 in operative position and to prevent accidental displacement thereof. It will be apparent that the spring 19 may be readily slid into and out of operative position when it is desired to change and re-arrange the insignia elements in the clip, and though easily accessible for making such changes, the spring is normally concealed from view within the mounting end portion 14 of the clip.

In Fig. 4 of the drawing I have shown a modified form of insignia inserts 20 arranged in the mounting end 21 of the clip. The outer crosshead of the mounting end 21 has downwardly projecting portions 22 forming depending walls extending longitudinally of the aperture therein. The inserts 20 are in the form of relatively thick blocks having a contour at the inner ends thereof adapted to closely engage the outer surface of a support 11a. The side walls 20a of the elements closely engage the depending walls 22, thereby insuring proper alinement of the elements in said clip. I have shown the elements 20 cemented, welded or otherwise secured as at 23 to the support 11a. The elements 20 may be formed from any desired material or combinations of material, for example, they may be formed from metal, thermoplastic, such as cellulose acetate, or may even comprise precious stones in suitable mountings to produce a more elaborate clip. It will also be understood that the insignia elements 20 may be engraved, inlaid or otherwise formed and that any combination of colors may be employed to produce the desired effect in the clip.

In the slightly modified form of construction shown in Fig. 5, the mounting end 24 of the clip is provided with an aperture in the outer crosshead thereof bounded at opposed sides thereof by angular depending portions 25 forming the inset shoulders 26. The insert elements 27 are of substantially T-shaped cross-sectional form. The arms with the T-shaped elements form shoulders 27a adapted to bear against the shoulders 26 in retaining the elements in proper alinement, while the base 27b of the T-shaped elements is fashioned at the lower end thereof to fit the outer contour of the support 11b, means being provided as at 28 for cementing, welding or otherwise securing the elements to the support 11b. Here again it will be understood that any material or combinations of materials may be used in forming the elements 27 as more fully described in connection with Fig. 4.

In Fig. 6 I have shown another modification of insignia insert arranged in a clip provided with an aperture 16 in the outer crosshead thereof similar to that shown in Figs. 1 to 3 of the drawing. In this modfiication, the insignia inserts 29 are formed form relatively thin and resilient material. The elements 29 each comprise a top characterized wall 29a having integral depending projections 29b at opposed sides thereof. The projections 29b have recesses or grooves 29c adjacent the upper ends thereof adapted to receive the edges of the aperture 16. In mounting the insignia inserts 29 in connection with the clip, the inserts 29 are pushed downwardly or inwardly until the grooved portions 29c snap into engagement with the edges of the aperture 16, thereby firmly securing the inserts in position. The lower projections 29b are preferably curved inwardly as clearly shown in the drawing to facilitate insertion of the elements 29. While the elements mounted on the clip, as above described, are firmly supported against accidental displacement, it will be apparent that the elements may be readily removed and interchanged when desired. It will be understood that any suitable resilient material may be used to form the elements 29, such for example as metals or plastic materials such as Celluloid or cellulose acetate.

Fig. 7 shows a slight modification of the construction shown in Fig. 6 wherein the mounting end 30 of the clip is provided in the outer crosshead thereof with an aperture having narrower flanged or beaded edges 31. The insignia inserts 32 in this modification have relatively rigid hookshaped projections 32a at one side thereof adapted to engage one of the beaded edges 31, and at the other side thereof, curved projections 32b, grooved as at 32c to receive the opposed beaded edge 31. In mounting each insert 32, the portion 32a is hooked around one beaded edge 31 of the aperture and the opposed curved projection on the insert is slid over the opposed beaded edge until the groove 32c snaps into engagement with said edge. In this construction it will again be apparent that any desired material may be used in forming the insignia inserts 28.

In the modification shown in Fig. 8, the aperture formed in the mounting end 33 of the clip is bounded on opposed sides thereof by pairs of downwardly projecting spring members 34 having offset portions 35 at the lower ends thereof. The insignia inserts 36 are shown as comprising relatively thick blocks having elongated grooves 37 along opposite sides and intermediate the upper and lower surfaces thereof. The grooves 37 are adapted to register with the offset portions 35 of the projections 34, said projections being sufficiently resilient to permit insertion of the elements 36, while at the same time insuring positive engagement with said elements when the offset portions 35 are seated in the grooves 37. By providing a separate pair of members 34, to support each insert 36, positive support of each element is insured regardless of any slight variations in the size of said elements or the grooves therein. It will be noted that the base of each element 36 when mounted in said clip, is spaced slightly apart from the outer surface of the support 11c. For normal purposes, the inserts will be supported solely by the members 34 cooperating with the grooves 37. It will be understood, however, that if desired, an adhesive of suitable type may be included between the elements 36 and the support 11c as previously described in connection with Figs. 4 and 5, and as indicated at 38.

It will be noted that in each instance my clip may be first permanently secured to the pen or other support and the insignia elements may thereafter be arranged or rearranged in the clip without the use of any special tools or implements. This feature is of great importance from a commercial standpoint, as it materially decreases the cost of the characterized clips and saves time in the purchase of the same since the proper elements may be inserted almost instantly upon selection.

It will be apparent that any type or style of clip may be provided with a mounting end as above described adapted to support insignia inserts in connection with the clip. It will further be understood that a wide selection of insignia inserts may be provided having the insignia printed, engraved, inlaid or otherwise arranged thereon in any color or combination of colors, or if desired, the inserts may comprise mountings of precious or semi-precious stones to produce the desired ornamentation in a clip. While the insignia inserts have been shown and described as being independent and separately insertable in the clip, it will be understood that if desired, the elements may be arranged and secured together before mounting and then inserted as a unit in the aperture of the clip.

Having fully described my invention, what I claim as new and desire to secure by Letters Patent, is:

1. In a supporting clip of the class described having an elongated mounting end portion, said mounting end portion comprising a top wall, depending side walls and one end wall forming a substantially channel-shaped body of said end portion, the side walls having integral projecting prongs for mounting the clip upon a suitable support, the top wall of said channel body having an elongated aperture within the boundaries of said side walls, a plurality of insignia elements arranged within the aperture of said body in abutting relation with the outer surfaces of the elements exposed through said aperture, the long sides of said aperture having depending flanges extending into the channel of said body, the opposed sides of said elements fitting snugly within said aperture in abutting relation to each other and in firm engagement with said flanges, and means retaining said elements against accidental displacement from said clip.

2. In a supporting clip of the class described having an elongated mounting end portion, said mounting end portion comprising a top wall, depending side walls and one end wall forming a substantially channel-shaped body of said end portion, the side walls having integral projecting prongs for mounting the clip upon a suitable support, the top wall of said channel body having an elongated aperture within the boundaries of said side walls, a plurality of insignia elements arranged within the aperture of said body in abutting relation with the outer surfaces of the elements exposed through said aperture, and the long sides of said aperture having depending flanges forming means in conjunction with grooves in opposed sides of said elements for resiliently engaging said elements and securing the same against displacement from said clip.

3. A clip of the class described comprising a spring arm having at one end an elongated body of channel cross-sectional form, said body comprising a top wall, depending side walls, and one end wall, the top wall having an elongated aperture extending longitudinally thereof inwardly of said side walls, the long sides of said aperture including downwardly and inwardly extending flanges integral with the top wall and formed from the material thereof, means projecting from the side walls of said body for attaching the body to a suitable support, a characterized element adapted to be arranged in the aperture of said body to expose the outer characterized surface of the element through the aperture in said body, and the side walls of said element adjacent the flanges of said body being grooved longitudinally to receive the inturned portions of said flanges in retaining the element against accidental displacement from said body.

4. A clip of the class described comprising a spring arm having at one end an elongated body of channel cross-sectional form, said body comprising a top wall, depending side walls, and one end wall, the top wall having an elongated aperture extending longitudinally thereof inwardly of said side walls, the long sides of said aperture including downwardly and inwardly extending flanges integral with the top wall and formed from the material thereof, means projecting from the side walls of said body for attaching the body to a suitable support, said flanges being severed longitudinally to form opposed pairs of resilient flanges, a plurality of characterized elements adapted to be arranged in the aperture of said body in abutting relationship to each other, each element being disposed between a pair of said resilient flanges, and each element having on the walls adjacent said flanges, longitudinal grooves for receiving the inturned portions thereof whereby each element is independently and detachably supported in said body and retained against accidental displacement therefrom.

5. A clip of the class described comprising a spring arm having at one end an elongated body of channel cross-sectional form, said body comprising a top wall, depending side walls, and one end wall, the top wall having an elongated aperture extending longitudinally thereof inwardly of said side walls, the long sides of said aperture including downwardly and inwardly extending flanges integral with the top wall and formed from the material thereof, means projecting from the side walls of said body for attaching the body to a suitable support, said flanges being severed longitudinally to form opposed pairs of resilient flanges, a plurality of characterized elements adapted to be arranged in the aperture of said body in abutting relationship to each other, each element being disposed between a pair of said resilient flanges, each element having on the walls adjacent said flanges, longitudinal grooves for receiving the inturned portions thereof, whereby each element is independently and detachably supported in said body and retained against accidental displacement therefrom, and means securing the inner surfaces of said elements to the surface of the support to which said body is attached.

6. A clip of the class described comprising a spring arm having at one end an elongated body of channel cross-sectional form, said body comprising a top wall, depending side walls, and one end wall, the top wall having an elongated aperture extending longitudinally theroef inwardly of said side walls, the long sides of said aperture including downwardly extending flanges integral with the top wall and formed from the material thereof, the side walls of said body having downwardly projecting lugs for mounting said body upon a suitable support with the outer surface of said support disposed within the channel of said body, a plurality of characterized elements arranged in abutting relation to each other in the aperture of said body with the outer surfaces of said elements substantially flush with the top wall of said body, said inturned flanges forming supports and reinforcements for the elements arranged in the aperture thereof and the inner ends of said elements engaging the surface of the support, and means securing the elements to said surface.

CLINTON E. MARSHALL.